United States Patent Office 3,830,949
Patented Aug. 20, 1974

3,830,949
PROCESS FOR CONVERTING RETROGRADED AMYLOSE CONTAINED WITHIN CELLS OF A DEHYDRATED POTATO PRODUCT TO SOLUBLE AMYLOSE
Mounir A. Shatila, Blackfoot, Idaho, assignor to American Potato Company, San Francisco, Calif.
No Drawing. Filed Sept. 1, 1971, Ser. No. 177,089
Int. Cl. A23b 7/02
U.S. Cl. 426—456
15 Claims

ABSTRACT OF THE DISCLOSURE

A mixture consisting essentially of a dehydrated potato product and water, having a moisture content of 25–70%, is heated to a product temperature of about 220° F.–250° F. to effect a conversion of retrograded amylose, contained within the cells of said dehydrated potato product, to its soluble form followed by prompt reduction of said moisture content to about 7% before said soluble form of the amylose retrogrades so as to preserve the cold water absorption and cohesive properties acquired as a result of said conversion.

BACKGROUND OF THE INVENTION

Field of the Invention

The invention relates to the treatment of dehydrated instant mashed potato products to alter their properties so that the altered products in dough form exhibit increased cold water absorption, decreased mealiness, and increased cohesion. The invention involves heat treatment of the potato products at intermediate moisture to product temperatures above the boiling point of water. The proper intermediate moisture level is obtained by adding water to the dehydrated products or reducing the normal water content of cooked and/or raw potatoes by admixing with the dehydrated potato products. The moist treated product may be either directly sheeted and fried to make a potato-chip-like snack or promptly dried to a stable moisture content of about 12–15% for subsequent frying or completely dried to about 7% moisture and ground for later use in fabricating a potato chip-type snack.

DESCRIPTION OF THE PRIOR ART

The prior art discloses many processes by which cooked potatoes are made more mealy and less cohesive. In U.S. Pat. No. 1,400,176, steamed potato slices are cooled by cool moist air before drying to prevent adherence. In U.S. Pat. No. 1,299,493, potato pieces are partly cooked in steam and then cooled in water to deprive them of stickiness. In U.S. Pat. No. 2,787,553, potato pieces are heated in water at 140–180° F. before cooking to increase mealiness and decrease pastiness. In U.S. Pat. No. 3,012,-897, a cooling step using water at not over 70° F. for at least 14 minutes was disclosed between the precooking step of U.S. Pat. No. 2,787,553 and the final cooking for the purpose of increasing mealiness or decreasing pastiness to a still greater degree. In U.S. Pat. No. 3,085,019, mixtures of potato solids and water are "modified" to produce mashed potatoes "having the friable, mealy, fluffy texture, being free of gumminess, stickiness, pastiness____." The purpose of this "modification" is to produce products which have a low Blue Value (low free soluble starch).

All dehydrated instant mashed potato products currently being produced, such as potato granules, potato flakes, and potato Buds, make use of this prior art to promote the retrogradation of cooked potato starch, thereby increasing mealiness—a required characteristic for good mashed potatoes. Our invention uses such dehydrated products as starting material and converts them to reverse the mealiness characteristic for uses in which cohesiveness is required.

The prior art teaches that pressurized steam treatment of low moisture potato starch results in apparent retrogradation and decrease in cohesiveness. It is also known that amylose can be dissolved in water if a sufficiently high temperature of about 125° C.–150° C. (257° F.–302° F.) is used.

SUMMARY OF THE INVENTION

The invention is directed to reversing retrogradation of potato starch in dehydrated potato products by wetting and heat treating.

When potato starch is heated in the presence of the natural water content of the potato, it undergoes gelatinization. Two types of starch are found in potatoes. The amylose or straight chain fraction, which is about 22–26% of the total starch, is soluble when freshly gelatinized, and when liberated, as by cell rupture, imparts a characteristic described as gumminess, stickiness, or pastiness. This normally undesirable characteristic in mashed potatoes is reduced in processes producing dehydrated instant mashed potato products by (a) reducing cell breakage, (b) tying up soluble amylose with complexing chemicals such as monoglycerides, (c) precooking and cooling before final cooking, whereby the amylose is retrograded to its insoluble form which is not sticky, gummy, or pasty, or (d) retrograding the liberated amylose after cooking and before drying by allowing to stand for a period of time at reduced temperatures. The rate of retrogradation increases inversely with temperature. All of these techniques are used in the production of the various forms of dehydrated instant mashed potatoes where mealiness is a most important attribute. Such products consist essentially of dehydrated, previously separated intact potato cells either singly or in small groups as in potato granules or in the form of agglomerates or aggregates as in the case of potato Buds or potato flakes. These products are not satisfactory without binder addition in the production of potato base snacks where a cohesive dough is required. To make such products more suitable for this use, extensive cell breakage, such as by extremely fine milling, is required to liberate sufficient free starch to serve as the cohesive agent. An alternative method of making potato base snacks is to add starches, gums, or binders to the dehydrated instant mashed potato products in an amount sufficient to create the required cohesiveness or to obtain cohesiveness by the use of extreme high temperature—high pressure extrusion usually coupled with extensive mixing.

The invention consists of two important steps. The first is to subject dehydrated potato products containing retrograded amylose, after adjusting to a controlled intermediate moisture content, to a temperature which seemingly reverses retrogradation, thereby converting at least part of the retrograded amylose to its original soluble form. The second important step is to dry the product to a stable moisture content quickly before the amylose fraction again retrogrades and becomes insoluble. In the dry state, the tendency to retrograde is arrested.

The moisture content at the time of heat treatment and the product temperature required for the desired conversion are both extremely critical. For example, heating a potato product to 212° F. or below, even at optimum moisture level, would tend to promote retrogradation, (amylose insolubility) but at 220° F. or above, the reverse is true—the amylose starch fraction solubility is increased significantly. Higher temperatures than 220° F., however, increase the likelihood of color damage. Although the desired conversion takes place over the wide moisture range between about 25 and 70% if the critical product temperature is reached, the preferred moisture is 25 to 45%. Samples adjusted to moisture levels below 25% and then heated, exhibited color damage and the formation of an undesirable "cereal-type" flavor. Samples above 45% in moisture, when heated, are difficult to sheet and handle.

When the invention is practiced on a dehydrated instant mashed potato product, such as potato granules, the converted product when dried and ground, rehydrates quickly in 5 parts by weight of cold water to form a mix with the consistency of sticky mashed potatoes, whereas, the same product before treatment forms a thin slurry-like soup under the same rehydration conditions. The rehydrated product of our invention has a gummy and sticky texture, whereas, the same product before treatment is friable and mealy, even when reconstituted with hot water as in making mashed potatoes.

In another embodiment, the moist heat converted product can be directly sheeted, cut, and fried at about 350° F. for 12–20 seconds to form excellent potato chip-like snacks. Alternatively, the sheeted cut pieces of the converted product can be dried to the range of 12–15% moisture content to assure microbial stability and stored for subsequent frying to snacks.

DESCRIPTION OF THE PREFERRED EMBODIMENTS

Example No. 1

Potato granules which are essentially dehydrated intact cooked potato cells, were mixed with water and salt to give a damp mix with 31% moisture and about 2–3% salt. A ¼" thick layer of the above mix was treated in an autoclave at 15 pounds pressure (250° F.) for 5 minutes. The hot treated mix was sheeted 0.03" and cut into pieces which were directly fried at 350° F. for 15–20 seconds in deep fat to produce expanded snacks of excellent flavor and texture.

When the same procedure was followed, eliminating the autoclaving but heating to boiling water temperature, the dough could not be sheeted, and formed pieces disintegrated in the frying step.

In the production of converted pieces for snack use, the thickness of the sheet was found to be critical. Pieces thinner than 0.015 inches produced snacks which were too fragile, resulting in excessive breakage. Pieces thicker than 0.04 inches were judged to be too tough and leathery in texture after frying. Pieces with a thickness in the range 0.02–0.03 inches were judged excellent and 0.025 inches was judged optimum thickness prior to frying.

Example No. 2

2 parts by weight of potato granules were mixed with 1 part by weight of freshly cooked and riced potatoes to give a damp mix of about 30% moisture. The mix was steam treated as in Example 1 and formed into a dough which fried to an excellent snack.

Example No. 3

2 parts by weight of potato granules were mixed with 1 part by weight of ground raw potatoes to give a moisture content of about 30%. The mix was steam treated and handled as in Example No. 1. The finished snacks had a good texture and a stronger potato taste.

In the above examples, the steaming treatment increased the moisture content of the mix only about 1–2%.

Example No. 4

Commercial potato granules were moistened to 40%, spread in a ¼ inch layer and steamed for 5 minutes at 15 pounds pressure. The converted damp mix was then granulated to facilitate drying and then dried to about 7% moisture with hot air. The dried product was ground to pass a 60 mesh screen and analyzed in comparison with a sample of the untreated potato granules and a sample of the same granules which had been ground for 10 minutes at high speed in a Waring Blendor with the following results:

|  | Blue Value Index* | Cold water absorption ratio** |
| --- | --- | --- |
| Commercial potato granules | 11.0 | 3.1:1 |
| Ground potato granules | 35.0 | 3.3:1 |
| Treated potato granules | 775.0 | 7.0:1 |

* Absorbance of 0.5% solution at 640-700 mµ×500.
** Parts cold water by weight absorbed by 1 part by weight product.

The dramatic change in the product resulting from the conversion utilizing pressurized steam is further shown by cold water viscosity as measured in a Brabender Visco Amylograph using 25 g. product/100 ml. of water at 0–4° C. as shown in the following table:

| | Amylograph viscosity units | |
| --- | --- | --- |
| Time in Amylograph | Commercial potato granules | Converted potato granules |
| 0 minutes | 0 | 0 |
| 2 minutes | 0 | 160 |
| 4 minutes | 0 | 300 |
| 6 minutes | 0 | 370 |
| 8 minutes | 0 | 420 |
| 10 minutes | 0 | 450 |

In this embodiment of my invention, the heat treated dough can be formed and fried directly into snacks, or the formed pieces can be dried to about 12–15% moisture for subsequent frying. Alternatively, the dough can be pelletized and quickly dried and then ground to produce a product which can be reconstituted to produce a snack dough with the required physical characteristics.

Example No. 5

A 40% moisture mix produced as in Example 4 was fed into the nip of a double drum dryer with drum surface temperature of about 300–350° F. and drum clearance of about .003"–.005". Although the residence time of the product on the drum is only about 10–15 seconds, product temperature is almost instantly raised to the critical point at which the desired conversion reaction takes place. The film removed from the rolls had a moisture content of about 7%, and when ground, had a similar dramatic increase in Blue Value Index, cold water absorption, and cold water viscosity, as shown by the following results:

|  | Blue Value Index | Cold water absorption ratio |
| --- | --- | --- |
| 1. Commercial potato granules | 11.0 | 3.1:1 |
| 2. Ground potato granules (Waring Blendor) | 35.0 | 3.3:1 |
| 3. Potato granules, 40% moisture, drum dried, clearance .005", 70 p.s.i., −60 mesh. | 462.5 | 6.6:1 |

| | Amylograph viscosity units | |
| --- | --- | --- |
| Time in Amylograph | Potato granule control | Converted potato granules |
| 0 minutes | 0 | 0 |
| 2 minutes | 0 | 40 |
| 4 minutes | 0 | 130 |
| 6 minutes | 0 | 220 |
| 8 minutes | 0 | 270 |
| 10 minutes | 0 | 300 |

Using this technique, conversion and drying are done in one operation. The converted product leaves the drum as a dry flaked sheet which is then ground to pass about 60–80 mesh screens.

The drum clearance and roll temperature as used in Example 5 resulted in a completely dried product. Subsequent tests at the same roll temperature showed that drum clearances as wide as 0.009 inches resulted in satisfactory conversion but incomplete drying. One skilled in this art will appreciate that such a product could be further dried to completion by any other conventional drying means.

In the processes of both Examples 4 and 5, the damp mix from a conventional potato granule operation can be utilized. Such a damp mix is usually in the moisture range of 30–35% and consists of approximately 2 parts by weight of potato granules with retrograded amylose and 1 part by weight of freshly cooked potatoes with soluble amylose. On the basis of solids, about 90% are from the potato granules which have retrograded amylose and 10% are from the freshly cooked potatoes with soluble amylose.

It is theorized that the heat treatments as disclosed, result in a conversion which forms or liberates large quantities of soluble amylose not available in the untreated products. Blue Value Index is a measure of soluble or unretrograded amylose, and the physical characteristics of cold water absorption and increased viscosity created in the heat treated products are consistent with increased soluble amylose content.

All dehydrated instant mashed potato products contain retrograded or insoluble amylose. The literature indicates that temperatures of 125° C.–150° C. (257° F.–302° F.) are necessary to solubilize pure retrograded amylose; however, we find that the desired conversion in reconstituted dehydrated instant mashed potato products takes place at 220 F. or above product temperature. Although the mechanism of the conversion is not known, subsequent tests indicate that more than the reversal of retrogradation of amylose may be involved. The best results were obtained when the damp mix was steamed while at a moisture content of 25–45%. Below 25%, the dried product tended to discolor and have a cereal-type flavor. Moisture levels above 45% made the steamed product difficult to handle and dry.

Tests were also conducted to determine more closely the product temperature required to produce the required conversion. When the product temperature of dehydrated instant mashed potato products adjusted to the optimum 25–45% moisture was raised to the 190–215° F. range, the treated product, after drying, was unchanged from the starting material in regard to water absorption and cohesiveness. In tests where the product temperature reached or exceeded 220° F., the desired conversion took place. This was surprising in view of prior art teaching that pure retrograded amylose reversal requires temperatures of 150° C. (302° F.) for complete solubilization.

In the pressurized steam treatment embodiment, the temperature requirement was reached by steam treating at 15 pounds steam pressure for 5 minutes. It will be obvious to one skilled in the art that the time-temperature requirements will vary somewhat, depending upon the thickness of the layer treated.

Additional tests showed that the product of our invention could likewise be produced by mixing other dehydrated instant mashed potato products such as potato Buds and potato flakes, with cooked or raw potatoes which supplied the moisture required to make a mix of 25–70% moisture. The mixes were pressure steamed as above and then promptly dried to about 7% moisture and ground as in the above examples. The resulting products all had the desired characteristics comparable to those of Examples 4 and 5.

Most dehydrated instant mashed potato products are made by processes which utilize precooking and cooling. The use of these processing steps does not affect the efficiency of our inventive process since amylose which is retrograded during precooking and cooling seems to be converted to its original soluble form during the heating step, thereby negating the tendency to increase mealiness.

Treated samples all showed tremendous increases in Blue Value Index, a measure of the available soluble amylose starch fraction as described in U.S. Pat. No. 3,085,019, which disclosed a process for decreasing Blue Value Index, thereby increasing mealiness.

Although the foregoing invention has been described in some detail by way of illustration and example for purposes of clarity and understanding, it will be apparent to one skilled in this art that certain changes and modification may be practiced within the spirit of the invention.

A process is disclosed to convert potato products which are suitable for rehydration to mealy mashed potatoes into products completely unsuitable for mashed potatoes but with the attributes required for producing a potato dough which can be formed and fried to produce excellent expanded snacks.

What is claimed is:

1. A process for converting at least part of the insoluble retrograded amylose contained within the cells of a dehydrated instant mashed potato product to soluble amylose thereby producing a product suitable for use in producing expanded potato-chip-like snacks comprising the steps of:
   (a) producing a moist mix of 25–70% moisture content and consisting essentially of intact cooked potato cells of said dehydrated instant mashed potato product containing therein retrograded insoluble amylose and water; and
   (b) heating said moist mix to a product temperature in the range of 220° F. to 250° F., thereby converting at least part of said retrograded amylose to its soluble form, and then
   (c) drying said heated mix to about 7% moisture before said soluble amylose retrogrades; and
   (d) grinding said dried mix to pass about a 60 mesh screen.

2. The process of claim 1 in which at least part of said intact cooked potato cells are selected from a group consisting of commercial potato granules, commercial potato flakes, and commercial dehydrated instant mashed potato products.

3. The process of claim 1 in which said water at least in part is supplied by the incorporation of cooked mashed potatoes.

4. The process of claim 1 in which said heating is accomplished by pressurized steam.

5. The process of claim 1 further characterized by:
   (a) forming said heated mix into pieces; and
   (b) deep fat frying said formed pieces at about 350° F. for about 15–20 seconds.

6. The process of claim 1 further characterized by:
   (a) forming said heated mix into snack size pieces with a thickness in the range of 0.02–0.03 inches; and
   (b) drying said formed pieces to a moisture content of about 12–15%.

7. The process of claim 1 in which said drying is facilitated by granulating said heated mix prior to drying.

8. The process of claim 1 in which said heating is accomplished by placing said moistened mix in contact with a surface heated to about 300–350° F.

9. The process of claim 1 in which said moistened mix has a moisture content in the range of 25–45%.

10. The process of claim 1 further comprising the steps of:
    (a) rehydrating said ground dried mix with water to form a cohesive dough of about 30% moisture content;
    (b) forming said dough into snack size pieces; and
    (c) deep fat frying said formed pieces at about 350° F. for about 15–20 seconds.

11. A process for altering potato granules comprising retrograded amylose contained therein to a dehydrated potato product comprising the converted soluble form of said amylose said potato product being reconstitutable to a gummy, sticky dough comprising soluble amylose within said granules and suitable for snack production comprising the steps of:
    (a) moistening potato granules comprising retrograded amylose contained therein to a moisture content of 25–45% by the addition of water;

(b) converting at least part of said retrograded amylose contained within said moistened potato granules to soluble amylose by heating to a product temperature of at least 220° F. by exposing to pressurized steam at about 250° F.;

(c) granulating said converted potato granules;

(d) air drying said granulated converted potato granules to about 7% moisture to prevent amylose retrogradation; and (e) grinding said dried granules to pass about a 60 mesh screen.

12. A process for converting retrograded amylose of potato solids which are rehydratable to a mealy mash to soluble amylose contained within the cells of a dehydrated potato product rehydratable to a non-mealy cohesive sticky mash comprising the steps of:

(a) mixing dehydrated instant mashed potato solids with cooked potatoes to form a mix of 25-45% moisture content;

(b) heating said mix to a product temperature of at least 220° F. by heating said mix on a 300-350° F. surface for about 10-15 seconds;

(c) drying said heated mix to about 7% moisture; and (d) grinding said dried mix.

13. The process of claim 12 further characterized by substituting, at least in part, ground raw potatoes for cooked potatoes.

14. The process as recited in claim 12 in which said heating and at least part of said drying are accomplished by placing said heated mix in the nip of a double drum dryer with a drum temperature of about 300-350° F.

15. The process as recited in claim 12 in which said heating is accomplished by steam and said drying is accomplished by hot air.

References Cited

UNITED STATES PATENTS

| | | | |
|---|---|---|---|
| 2,780,552 | 2/1957 | Willard | 99—207 |
| 3,021,223 | 2/1962 | Eskew | 99—207 |
| 3,009,816 | 11/1961 | Hendel | 99—207 |
| 3,085,019 | 4/1963 | Kueneman | 99—207 |
| 3,085,020 | 4/1963 | Backinge | 99—207 |
| 3,451,822 | 6/1969 | Fast | 99—100 P |
| 3,459,562 | 8/1969 | Beck | 99—207 |
| 2,381,838 | 8/1945 | Rendle | 99—207 |
| 3,297,450 | 1/1967 | Laska | 99—207 |
| 3,535,128 | 10/1970 | Willard | 99—207 |
| 3,692,537 | 9/1972 | Gerkens | 99—207 |

OTHER REFERENCES

*Potato Processing*, Talburt & Smith, pp. 374–76, Avi Publishing Co., Westport, Conn., 1967.

WILBUR L. BASCOMB, JR., Primary Examiner

M. G. MULLEN, Assistant Examiner

U.S. Cl. X.R.

426—464, 465, 506, 520